United States Patent

Beim et al.

[11] Patent Number: 5,800,304
[45] Date of Patent: Sep. 1, 1998

[54] MULTIPLE-SPEED AUTOMATIC TRANSMISSION FOR AN AUTOMOTIVE VEHICLE

[75] Inventors: Rudolf Beim, Bloomfield Hills; Daniel W. McCarrick, Canton, both of Mich.

[73] Assignee: Ford Global Technologies, Inc., Dearborn, Mich.

[21] Appl. No.: 740,181

[22] Filed: Oct. 28, 1996

[51] Int. Cl.⁶ .................................................. F16H 3/44
[52] U.S. Cl. .......................................... 475/285; 475/275
[58] Field of Search ................................ 475/275, 277, 475/284, 285, 288, 289

[56] References Cited

U.S. PATENT DOCUMENTS

| | | |
|---|---|---|
| 3,863,524 | 2/1975 | Mori et al. . |
| 3,946,622 | 3/1976 | Murakami et al. . |
| 3,979,974 | 9/1976 | Murakami . |
| 3,999,448 | 12/1976 | Murakami et al. ........................ 475/276 |
| 4,089,230 | 5/1978 | Murakami et al. ...................... 475/277 X |
| 4,089,238 | 5/1978 | Forster et al. ........................... 475/277 X |
| 4,143,562 | 3/1979 | Murakami et al. . |
| 4,242,924 | 1/1981 | Melhorn et al. . |
| 4,368,649 | 1/1983 | Vahratian et al. . |
| 4,418,585 | 12/1983 | Pierce . |
| 4,483,215 | 11/1984 | Ishimaru et al. . |
| 4,509,389 | 4/1985 | Vahratian et al. . |
| 4,702,125 | 10/1987 | Kalns . |
| 4,939,955 | 7/1990 | Sugano . |
| 4,976,670 | 12/1990 | Klemen . |
| 5,007,887 | 4/1991 | Asada . |
| 5,083,992 | 1/1992 | Asada .................................. 475/284 X |
| 5,098,357 | 3/1992 | Asada et al. ......................... 475/284 X |
| 5,536,220 | 7/1996 | Martin .................................... 475/275 |

FOREIGN PATENT DOCUMENTS 2272735  5/1994  United Kingdom .

Primary Examiner—Khoi Q. Ta
Assistant Examiner—Peter T. Kwon
Attorney, Agent, or Firm—Frank G. McKenzie

[57] ABSTRACT

A kinematic arrangement of an automatic transmission includes three planetary gear units having certain of their elements fixed to other elements mutually, a one-way coupler for holding the sun gear of the first gear unit, a clutch arranged in parallel with the coupler, a friction clutch driveably connecting a transmission input shaft to the sun gear of the first gear unit, a second friction clutch for driveably connecting the pinion carriers of the second and third gear units to the input shaft, a friction brake for holding the sun gear of the second gear unit against rotation, and a brake band for selectively holding the pinion carriers of the second and third gear units against rotation.

8 Claims, 1 Drawing Sheet

| | 72 | 74 | 80 | 82 | 70 | 78 |
|---|---|---|---|---|---|---|
| GEAR | B2 | B3 | CL3 | CL4 | B1 | OWC1 |
| 1 | X | | | | | X |
| 2 | X | | X | | | |
| 3 | X | | | X | | |
| 4 | | | X | X | | |
| 5 | | X | | X | | |
| REV2. | | | X | | X | |
| REV. | | | | | X | X |

MULTIPLE-SPEED AUTOMATIC TRANSMISSION FOR AN AUTOMOTIVE VEHICLE

BACKGROUND OF THE INVENTION

1. Technical Field

This invention relates to an arrangement of clutchs, brakes, and planetary gear units of an automatic transmission for a motor vehicle.

2. Description of the Prior Art

The gear system of U.S. Pat. No. 4,418,585 includes a pair of planetary gear units mounted on a first axis and an hydrokinetic torque converter mounted on a second axis parallel to the first axis. These are arranged to accommodate a vehicle engine that is mounted transversely with respect to the center plane of a motor vehicle. The transmission is able to provide four forward driving ratios and a single reverse ratio, the highest forward driving ratio being an overdrive.

U.S. Pat. No. 4,368,649 discloses planetary gearing that achieves a ratio change from the third to the fourth forward ratio without establishing timed disengagement of a high speed ratio clutch and application of a friction brake. It is only necessary to apply a single friction brake to achieve a ratio change to the highest ratio. A ratio change from the first to the second forward drive ratio results merely by engaging a second friction brake while the companion friction clutch remains applied. Therefore, a ratio change from the first ratio and from the third ratio in a forward range results merely by engaging and disengaging a single friction element, either a clutch or a brake, thereby greatly simplifying control of the clutches and smoothing the ratio changes during vehicle acceleration from a standing start.

SUMMARY OF THE INVENTION

It is an object of this invention to provide a multiple-speed automatic transmission having five forward speed ratios, three underdrive ratios, an overdrive ratio, and reverse drive. An advantage of this invention is the compact space required to contain the clutches, brakes, couplers, shafts, and planteary gear units. In realizing this object and advantages, the multiple-speed transmission of this invention includes an input shaft; an output shaft; and planetary gearing supported on a first axis comprising multiple planetary gear units, each gear unit having a sun gear, ring gear, carrier, and planet pinions supported rotatably on the carrier and driveably engaged with the sun gear and ring gear. The ring gear of the first gear unit is continually driveably connected to the input shaft. The ring gear of the third gear unit is continually driveably connected to the output shaft. The carrier of the first gear unit, ring gear of the second gear unit, and sun gear of the third gear unit are continually driveably connected mutually. The carriers of the second and third gear units are continually driveably connected mutually.

A first clutch alternatively driveably connects and releases the input shaft and sun gear of the first gear unit. A second clutch alternately driveably connects and releases the input shaft and carrier of the third gear unit. A first brake alternately holds against rotation and releases the sun gear of the second gear unit. A brake means alternately holds against rotation and releases the sun gear of the first gear unit. A second brake alternately holds against rotation and releases the carriers of the second and third gear units.

DESCRIPTION OF THE PREFERRED EMBODIMENT

Figures 1, 2:
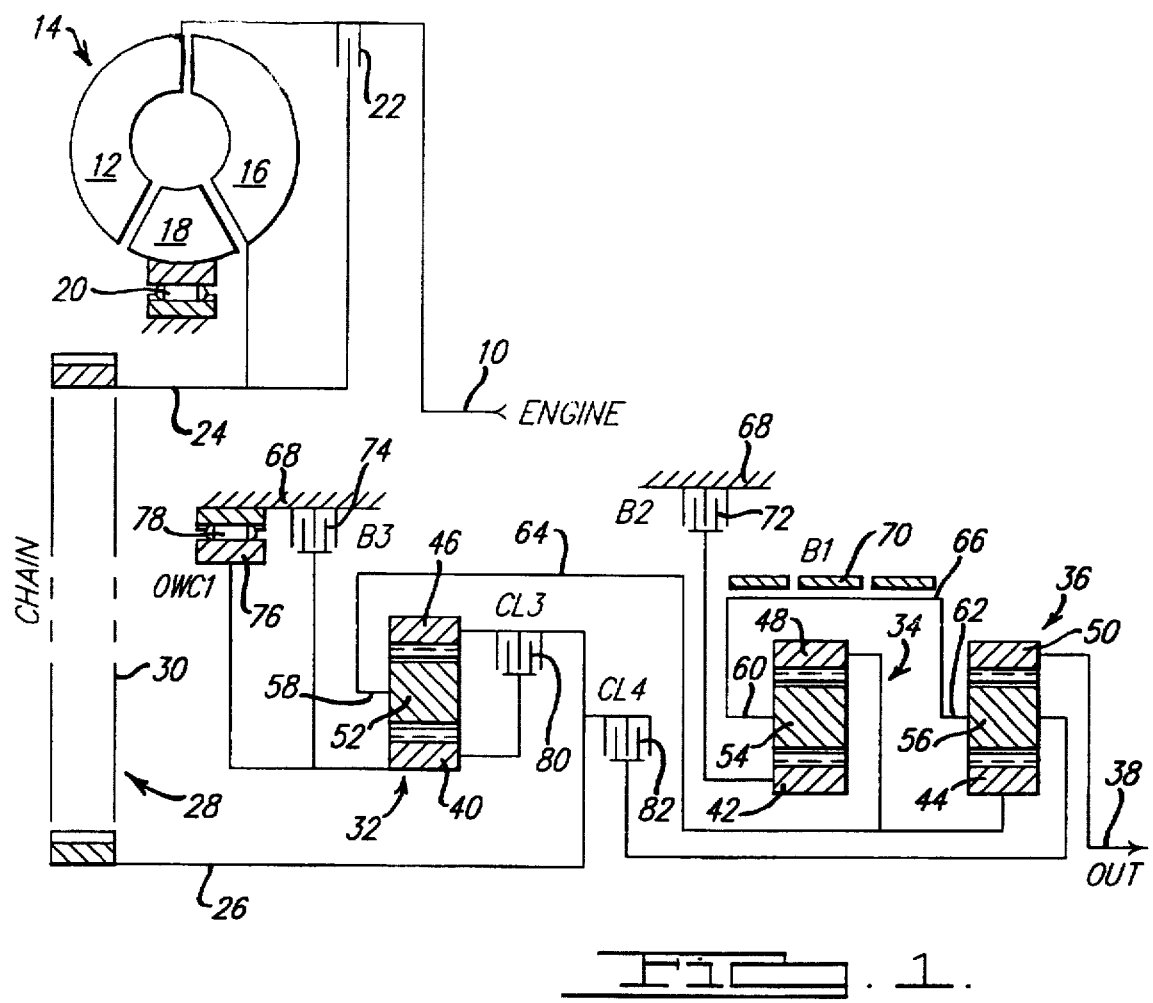
FIG. 1 is a schematic diagram of a kinematic arrangement of an automatic transmission according to the present invention.
FIG. 2 is a chart showing the state of the friction elements of FIG. 1 corresponding to each of the speed ratios of the transmission according to the present invention.

Referring first to FIG. 1, an engine crankshaft 10 drives the impeller wheel 12 of a hydrokinetic torque converter 14, which includes a turbine wheel 16 driven hydrodynamically from the impeller and a stator wheel 18 rotatably supported on a one-way clutch 20. A torque converter bypass clutch 22 is engaged and disengaged alternately to produce a fixed connection between the impeller wheel and turbine shaft 24, or to disengage that connection so that the turbine shaft is hydrodynamically connected to the impeller wheel.

Shaft 24 drives an input shaft 26 through a chain drive mechanism 28, which includes a sprocket wheel fixed to the turbine shaft 24, a second sprocket wheel fixed to the input shaft 26, and a drive chain or belt 30 driveably engaging those sprocket wheels.

Three planetary gear units 32, 34, 36 are located in a drive path between input shaft 26 and a transmission output shaft 38. Each gear unit includes a sun gear 40, 42, 44; ring gear 46, 48, 50; a set of planet pinions 52, 54, 56 in continuous meshing engagement with the corresponding ring gear and sun gear and supported rotatably on a corresponding planetary pinion carrier 58, 60, 62.

Member 64 provides a continuous drive connection among carrier 58, ring gear 48, and sun gear 44. Planet carriers 60 and 62 are continuously driveably connected mutually through a brake drum 66, which is held against rotation on the transmission casing 68 by applying brake band 70, or is released for rotation by disengaging brake 70. Input shaft 26 is continuously connected driveably to ring gear 46; output shaft 38 is driveably connected continuously to ring gear 50.

A first hydraulically actuated friction brake 72 is engaged to hold sun gear 42 fixed against rotation on the transmission casing 68 and to release that sun gear for rotation. A second friction brake 74 is engaged to hold sun gear 40 fixed against rotation on the transmission housing and to release sun gear 40 for rotation. The inner race 76 of a one-way clutch 78 is continuously driveably connected to sun gear 40 and, through engagement of brake 74, to the transmission casing. However, when brake 74 is disengaged, one-way coupling 78 can produce a one-way drive connection of the sun gear 42 to transmission casing 68.

An hydraulically actuated friction clutch 80 is engaged to driveably connect sun gear 40 and input shaft 26 to ring gear 46, and clutch 80 is disengaged to allow those components to rotate freely, subject to the state of another hydraulically actuated friction clutch 82, which, when engaged, driveably connects pinion carriers 60 and 62 to input shaft 26 and ring gear 46.

In operation, the first forward speed ratio results by engaging brake 72, which causes coupling 70 to driveably connect sun gear 40 to the transmission casing. With the gear units so disposed, input shaft 26 drives ring gear 46. First gear unit 32 drives pinion carrier 58, ring gear 48, and sun gear 44 at the same speed, which is reduced in relation to the speed of input shaft 26. Sun gear 42, held against rotation through brake 72, provides the torque reaction whereby the speed of pinion carriers 60 and 62 are determined so that the output, taken at ring gear 50 of the third planetary gear unit and output shaft 38, is established.

In a conventional way, output shaft 32 can be connected to a final drive planetary gear unit, whose output, taken at its planet carrier, is connected to a differential mechanism, through which the axle shafts of the motor vehicle are driven rotatably.

A nonsynchronous upshift to the second speed ratio occurs by maintaining brake 72 engaged and by concurrently engaging clutch 80. These actions cause coupling 78 to overrun, thereby releasing sun gear 40. In this condition, carrier 58, ring gear 48, and sun gear 44 are driven directly through the first gear unit 32 at the speed of input shaft 26 because clutch 80 connects sun gear 40 and ring gear 46 to the input shaft 26. Sun gear 42 provides the torque reaction. Pinion carriers 60 and 62 are underdriven at the same speed through operation of gear unit 34, so that the output is again taken at ring gear 50.

An upshift to a third forward speed ratio results by maintaining brake 72 engaged, disengaging clutch 80, and engaging clutch 82. Input shaft 26 is driveably connected through clutch 82 to pinion carriers 60 and 62. Sun gear 42 provides the torque reaction, and the output of second planetary gear unit 34, ring gear 48, is overdriven in relation to the speed of input shaft 26. Ring gear 48 drives sun gear 44; therefore, ring gear 50 and output shaft 38 are underdriven in relation to the speed of input shaft 26.

An upshift to the fourth forward speed ratio results by maintaining clutch 82 engaged and by engaging clutch 80. In this way, both sun gear 40 and ring gear 46 of the first planetary gear set are driven from input shaft 26 so that the speed of carrier 58, ring gear 48, and sun gear 44 is the same as the speed of input shaft 26. Similarly, clutch 82 connects pinion carriers 60 and 62 to input shaft 26. Therefore, since both sun gear 44 and pinion carrier 62 are driven at the same speed, the output taken at ring gear 50 is driven at the same speed as that of input shaft 26.

An upshift to the overdrive fifth speed ratio occurs by maintaining clutch 82 engaged and engaging brake 74. With sun gear 40 held against rotation and ring gear 46 driven from input shaft 26, pinion carrier 58 and sun gear 44 are driven slower than input shaft 26. Clutch 82 connects pinion carrier 62 to the input shaft; therefore, third planetary gear unit 36 overdrives ring gear 50 in relation to the speed of input shaft 26.

The arrangement of FIG. 1 can be used to produce a first relatively low gear ratio reverse drive by engaging clutch 80 and brake 70. This action produces a drive connection through the first planetary gear unit 32 so that ring gear 44 is driven at the speed of the input shaft. The pinion carrier 62 is fixed against rotation and provides a torque reaction point. A speed reduction is produced at the output ring gear 50.

A second relatively lower gear ratio reverse drive is produced by maintaining brake 70 engaged and disengaging clutch 80. This action causes one-way coupling 78 to produce a drive connection between sun gear 40 and the transmission housing, thereby holding the sun gear fixed against rotation. A first speed reduction is produced by the first gear unit 32, in which pinion carrier 58 and sun gear 44 are underdriven in relation to the speed of input shaft 26. Pinion carrier 62 of the third gear unit 36 is held fixed against rotation by brake 70 so that gear unit 36 produces a second speed reduction and drives ring gear 50 in the reverse drive direction.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

What is claimed:

1. A multiple-speed transmission comprising:

an input shaft;

an output shaft;

planetary gearing supported on a first axis comprising multiple planetary gear units, each gear unit having a sun gear, ring gear, carrier, and planet pinions supported rotatably on the carrier and driveably engaged with the sun gear and ring gear of the corresponding gear unit, the ring gear of the first gear unit continually driveably connected to the input shaft, the ring gear of the third gear unit continually driveably connected to the output shaft, the carrier of the first gear unit, ring gear of the second gear unit, and sun gear of the third gear unit continually driveably connected mutually, the carriers of the second and third gear units continually driveably connected mutually;

a first clutch for alternatively driveably connecting and releasing the input shaft and sun gear of the first gear unit;

a second clutch for alternately driveably connecting and releasing the input shaft and carrier of the third gear unit; and a first brake for alternately holding against rotation and releasing the sun gear of the second gear unit.

2. The transmission of claim 1, further comprising brake means for alternately holding against rotation and releasing the sun gear of the first gear unit.

3. The transmission of claim 2, wherein the brake means comprises:

an overrunning coupling adapted to produce a one-way drive connection between the sun gear of the first gear unit and a nonrotating member; and a brake alternately holding against rotation on the nonrotating member and releasing the sun gear of the first gear unit.

4. The transmission of claim 1, further comprising a housing, and wherein the brake means comprises:

an overrunning coupling having a first race continually driveably connected to the sun gear of the first gear unit, a second race fixed to the housing, and a drive member located between the first and second races for producing a one-way drive connection between the first and second races; and a brake arranged in parallel with the overrunning coupling between the sun gear of the first gear unit and the housing for alternately holding against rotation on the housing and releasing said sun gear.

5. The transmission of claim 1, further comprising a second brake for alternately holding against rotation and releasing the carriers of the second and third gear units.

6. A multiple-speed transmission comprising:

an input shaft;

an output shaft;

planetary gearing supported on a first axis comprising multiple planetary gear units, each gear unit having a sun gear, ring gear, carrier and planet pinions supported rotatably on the carrier and driveably engaged with the sun gear and ring gear of the corresponding gear unit, the ring gear of the first gear unit continually driveably connected to the input shaft, the ring gear of the third gear unit continually driveably connected to the output shaft, the carrier of the first gear unit, ring gear of the second gear unit, and sun gear of the third gear unit continually driveably connected mutually, the carriers of the second and third gear units continually driveably connected mutually;

a first clutch for alternatively driveably connecting and releasing the input shaft and sun gear of the first gear unit;

a second clutch for alternately driveably connecting and releasing the input shaft and carrier of the third gear unit;

a first brake for alternately holding against rotation and releasing the sun gear of the second gear unit;

brake means for alternately holding against rotation and releasing the sun gear of the first gear unit; and a second brake for alternately holding against rotation and releasing the carriers of the second and third gear units.

7. The transmission of claim 6, wherein the brake means comprises:

an overrunning coupling adapted to produce a one-way drive connection between the sun gear of the first gear unit and a nonrotating member;

a brake alternately holding against rotation on the nonrotating member and releasing the sun gear of the first gear unit.

8. The transmission of claim 7, further comprising a housing, and wherein the brake means comprises:

an overrunning coupling having a first race continually driveably connected to the sun gear of the first gear unit, a second race fixed to the housing, and a drive member located between the first and second races for producing a one-way drive connection between the first and second races; and a brake arranged in parallel with the overrunning coupling between the sun gear of the first gear unit and the housing for alternately holding against rotation on the housing and releasing said sun gear.

* * * * *